(12) United States Patent
Vogtmeier

(10) Patent No.: US 7,627,086 B2
(45) Date of Patent: Dec. 1, 2009

(54) DETECTOR ARRANGEMENT, ESPECIALLY FOR A COMPUTER TOMOGRAPH

(75) Inventor: Gereon Vogtmeier, Aachen (DE)

(73) Assignee: Koninklijke Philips Electronics N.v., Eindhoven (NL)

( * ) Notice: Subject to any disclaimer, the term of this patent is extended or adjusted under 35 U.S.C. 154(b) by 72 days.

(21) Appl. No.: 10/596,025

(22) PCT Filed: Nov. 19, 2004

(86) PCT No.: PCT/IB2004/052489
§ 371 (c)(1),
(2), (4) Date: Jan. 30, 2007

(87) PCT Pub. No.: WO2005/052635
PCT Pub. Date: Jun. 9, 2005

(65) Prior Publication Data
US 2007/0165770 A1 Jul. 19, 2007

(30) Foreign Application Priority Data
Nov. 28, 2003 (EP) ................................. 03104459

(51) Int. Cl.
*H05G 1/64* (2006.01)
*H01L 27/146* (2006.01)
(52) U.S. Cl. ..................... 378/98.8; 378/19; 250/370.09
(58) Field of Classification Search ............ 378/4, 378/19, 22, 98.8; 250/370.09, 370.11, 551; 385/26
See application file for complete search history.

(56) References Cited

U.S. PATENT DOCUMENTS

| 4,149,088 | A | * | 4/1979 | Lemelson | 250/551 |
| 4,259,584 | A | * | 3/1981 | Krumme | 378/15 |
| 4,401,360 | A | * | 8/1983 | Streckmann et al. | 385/26 |
| 4,464,776 | A | * | 8/1984 | Erker | 378/10 |
| 4,466,695 | A | * | 8/1984 | Kruger | 385/26 |
| 5,093,879 | A | * | 3/1992 | Bregman et al. | 385/93 |
| 5,134,639 | A | * | 7/1992 | Vekstein et al. | 378/15 |
| 5,185,675 | A | * | 2/1993 | Banks | 398/170 |
| 5,336,897 | A | * | 8/1994 | Watanabe et al. | 250/551 |
| 5,414,747 | A | * | 5/1995 | Ruud et al. | 378/73 |
| 5,514,873 | A | * | 5/1996 | Schulze-Ganzlin et al. | 250/394 |
| 5,535,033 | A | * | 7/1996 | Guempelein et al. | 398/114 |
| 5,978,438 | A | | 11/1999 | Resnick et al. | |
| 6,718,005 | B2 | * | 4/2004 | Hamada et al. | 378/15 |

OTHER PUBLICATIONS

Stanton, J.C.; A Low Power Low Noise Amplifier for a 128 Channel Detector Read-Out Chip; 1989; IEEE Transactions on Nuclear Science; 36(1)522-527.

Tsang, T., et al.; Electro-optical Modulators in Particle Detectors; 1995; Review of Scientific Instruments, American Institute of Physics; 66(7)3844-3854.

* cited by examiner

*Primary Examiner*—Edward J Glick
*Assistant Examiner*—Thomas R Artman

(57) ABSTRACT

A detector arrangement (10) for detecting and transferring detector signals to a processing unit is described. This detector arrangement is provided in particular for use in a computer tomograph for high-resolution detection of X-rays, the processing unit being in the form of a central processing unit or buffer memory (Z) on a rotatable portion of a gantry (1). To transfer the detector signals with the minimum number of contacts or plug-in connectors also in the case of a high-resolution detector arrangement (10), this comprises at least one detector module having a plurality of individual detector elements as well as an electrical unit having an electro-optical transducer for processing the signals of the detector elements and for generating optical detector module output signals.

19 Claims, 4 Drawing Sheets

DETECTOR ARRANGEMENT, ESPECIALLY FOR A COMPUTER TOMOGRAPH

The invention relates to a detector arrangement for detecting and transferring detector signals to a processing unit. The detector arrangement is provided in particular for use in a computer tomograph for detecting X-rays and for transferring the detector signals to a central processing unit or buffer memory on a rotatable portion of a gantry. The invention relates furthermore to a computer tomograph having such a detector arrangement.

Detector arrangements for detection of images generally comprise a plurality of individual detector elements, which are arranged in rows and columns and the number of which is selected to correspond to the desired image resolution and the desired number of image pixels.

Recent manufacturing techniques make it possible for detector arrangements to be produced with ever smaller detector elements, so that for the same detector area the number of detector elements can be increased even further in order to improve, for example, the resolution of the image.

Furthermore, the trend is towards making the detector arrangements larger and larger, so that for this reason too the number of detector elements is constantly increasing and hence in total the amount of data to be transferred can increase considerably.

Conventional detector systems having parallel or serial transfer of data quickly come up against their limits, since the space for the required number of contacts and plug-in connectors for connection of the detector arrangement to a data and image processing unit is often not available.

It is therefore an object of the invention to produce a detector arrangement from a plurality of individual detector elements, with which arrangement, using a substantially smaller number of contacts and plug-in connectors, the detected detector signals can be fed onwards for further processing.

Furthermore, a detector arrangement is to be produced with which the large amounts of data accumulating in particular where there is a high number of detector elements can be detected with relatively little effort and can be transferred in particular with a relatively small number of leads, for example, to a data-processing or image-processing unit.

This object is achieved as claimed in claim 1 by means of a detector arrangement having at least one detector module having a plurality of individual detector elements as well as an electrical unit having an electro-optical transducer for processing the signals of the detector elements and for generating optical detector module output signals.

Because the detector elements are combined in this way into groups that are located on at least one detector module, and this module has an electrical unit for generating optical detector module output signals, the number of contacts and connecting elements can be substantially reduced. This also results in clear cost savings.

Another advantage of this solution is that the modular construction of the detector arrangement enables individual modules to be relatively easily exchanged or, if necessary, complemented.

Further advantageous aspects of the invention are contained in the dependent claims.

The subject matter of the embodiment as claimed in claim 2 relates to a preferred manner of converting the detector module output signals.

The detector elements can also be actuated with the embodiment as claimed in claim 3.

Claim 4 contains a preferred realization of the optical transducer.

Claim 5 contains a preferred manner of the optical coupling of the detector modules to a fiber optic cable.

Claim 6 contains a preferred realization of the detector element, integration with the electrical unit as claimed in claim 7 having advantages in respect of manufacturing costs.

Claims 8 and 9 contain preferred structural embodiments of the detector modules.

The embodiment as claimed in claim 10 enables detector modules to be optically coupled in a relatively simple manner not only to one another, but also to a fiber optic infrastructure. Claim 11 contains a preferred embodiment of such a fiber optic infrastructure.

Finally, claims 12 and 13 relate to a computer tomograph with an embodiment of the inventive detector arrangement advantageous for that purpose.

These and other aspects of the invention are apparent from and will be elucidated, by way of non-limitative example, with reference to the embodiments described hereinafter.

IN THE DRAWINGS

Figure 1:
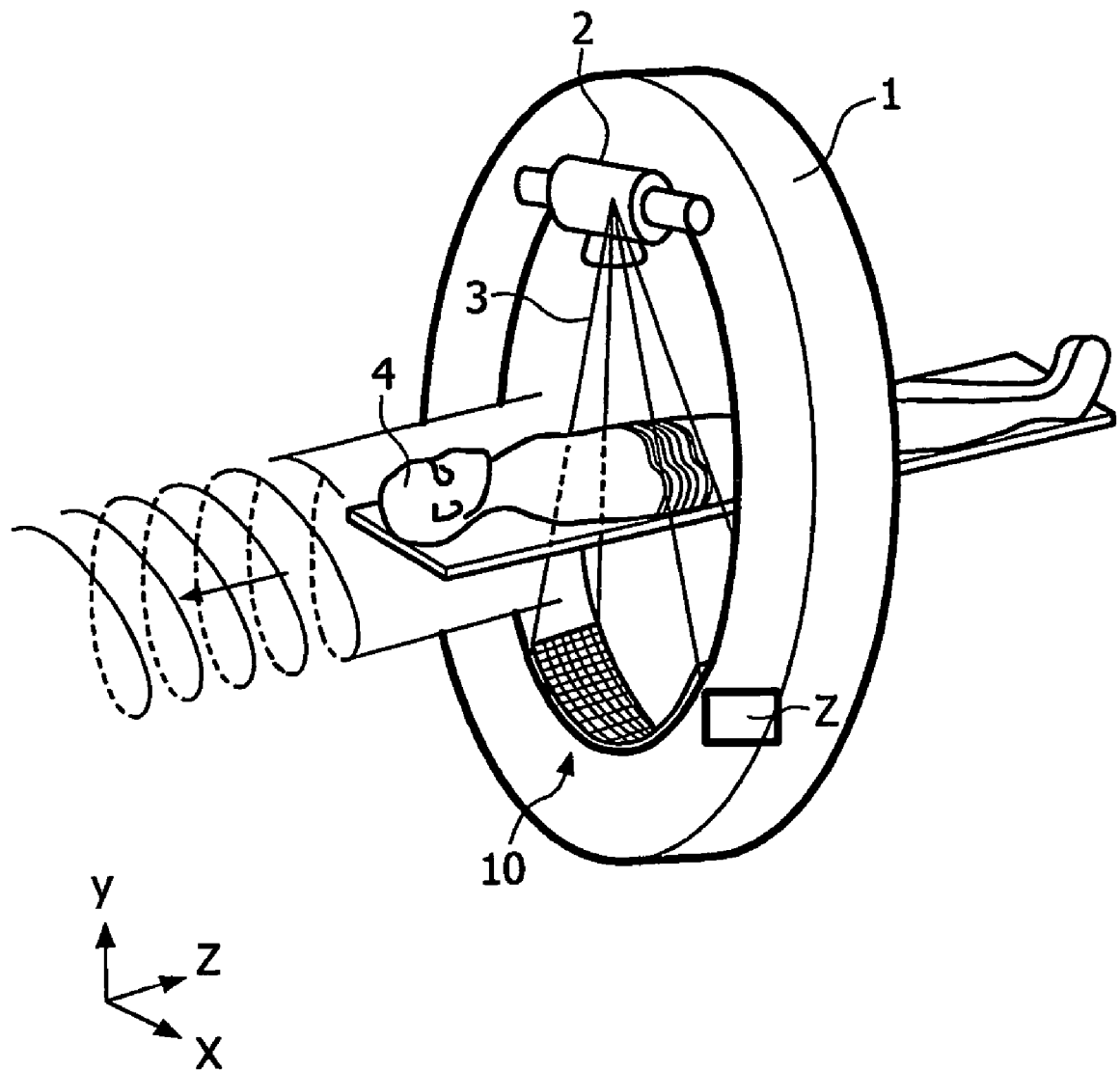
FIG. 1 shows schematically the essential components of the gantry of a computer tomograph.

FIG. 1 shows schematically the essential components of the rotatable unit of a gantry 1 as used in a computer tomograph. This rotatable unit can be turned by means of a first driving device (not illustrated) about a horizontal z-axis. A beam source 2, for example, an X-ray source, with which a fan-shaped beam bundle 3 can be generated, is fixed to the rotatable unit. The beam bundle 3 is directed onto a detector arrangement 10, which is secured diametrically opposite the beam source 2 to the rotatable unit.

Inside the gantry 1 there is an examination object 4, which can preferably be guided by means of a second driving device (not illustrated) through the gantry in the direction of the horizontal z-axis, while at the same time the rotatable unit of the gantry 1 is turned by means of the first driving device.

In that process, the beams passing through and/or scattered by the examination object 4 impinge on the detector arrangement 10.

The detector signals produced by the beams are transferred to a central processing unit (buffer memory) Z (indicated schematically) on the rotating unit of the gantry 1. From there, the signals are preferably fed by means of a wireless (for example, optical or electromagnetic) transmission means to an evaluating unit outside the gantry 1 and are stored there; the evaluating unit can be, for example, a data-processing or image-processing unit, with which in known manner images are produced and displayed.

Specifically, the detector arrangement 10 comprises a plurality of detector elements, each of which is associated with a pixel of the generated image and which are arranged in the form of a matrix having at least one row and a plurality of columns. The rows of detectors extend preferably in the circumferential direction of the gantry 1, while the columns extend perpendicularly thereto.

The detector arrangement 10 here comprises a plurality of detector modules, each of which comprising a plurality of detector elements that are preferably arranged on at least one detector chip (for example, a CMOS chip). The detector modules each form a structural unit, which is, for example, exchangeable and facilitates assembly of the detector arrangement 10 and mounting thereof on the gantry 1.

FIG. 2 shows a preferred structural layout of such a detector module Dx and its essential parts in a three-dimensional illustration (A) and in end elevation (B).

The detector module Dx comprises a module carrier 30, which is slidably held between two guide rails 31, 32, thus enabling several detector modules to be aligned next to one another. At least one of the two guide rails 31, 32 can simultaneously be in electrical contact with the detector modules Dx and can serve to supply one or both terminals of a power supply for the detector modules Dx.

The detector modules Dx have a substantially U-shaped inner space 33 for receiving an electrical unit 331. Below this inner space 33, in the module carrier 30 there is a cable duct 34 for one or more fiber optic cables 341, by means of which the individual modules Dx can be connected to one another and with the relevant central processing unit. Electrical leads can also be led through the cable duct 34, for example, to supply power to the detector modules Dx.

The inner space 33 is closed upwardly by a connector plate 35, on which the detector chip (for example, a CMOS chip 36 with scintillator 37) with a plurality of detector elements is located.

Figures 2A, 2B:
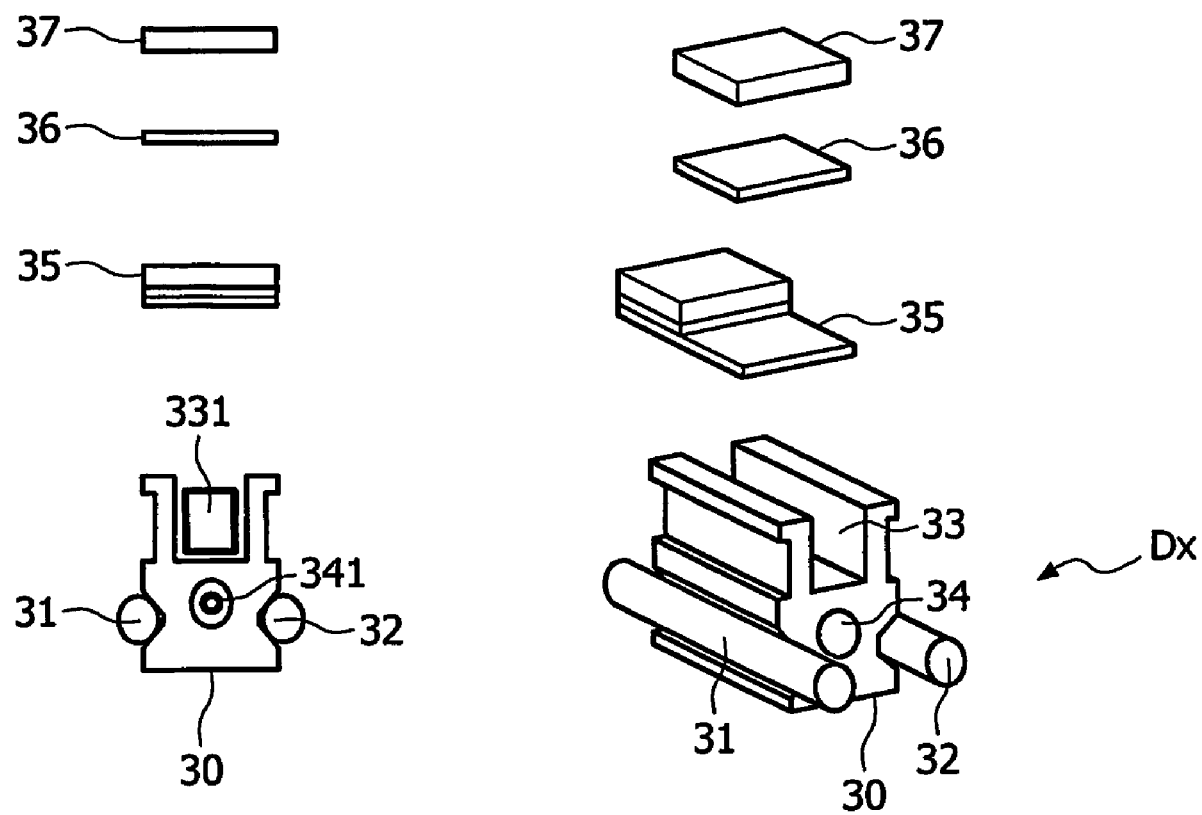
FIG. 2 shows the structural layout of a detector module.

In the inner space 33 each of the detector modules Dx contains, as shown in FIG. 2(B), the electrical unit 331 for processing the signals of the detector elements or rather the detector chip. This unit 331 comprises at least one electro-optical transducer for generating optical detector module output signals that are present at an optical output of the detector module (module output).

The electrical unit 331 can additionally contain an analog-to-digital converter and a parallel-to-serial converter, with which the analog detector signals occurring in parallel and detected by the detector chip 36, 37 are made available at the module output as serial, digital, optical detector module output signals.

At the module output, the signals can be injected by means of a fiber optic coupler into a fiber optic cable 341 running in the cable duct 34, as shown in FIG. 2(B), and be fed to the central processing unit Z, in order to be transferred from there by means of a cable-less, optical (or, if applicable, also electromagnetic) transmitter device to the evaluating unit or to another receiving unit outside the rotatable unit of the gantry 1.

Furthermore, the electrical unit 331 can comprise an opto-electrical transducer and, if necessary, a serial-to-parallel converter, with which input signals that are present at a module input of the detector module Dx are fed to the detector elements or rather the detector chip. Such detector module input signals can be, for example, control signals for the detector elements or rather for the detector chip. The module input is then optically coupled likewise by means of the fiber optic coupler with the fiber optic cable 341 running in the cable duct 34.

The electro-optical transducer and the opto-electrical transducer may comprise customary photodiodes or LEDs, laser diodes or other semiconductor elements and each represents an optical transmitter or receiver that is optically coupled by way of the fiber optic coupler to the fiber optic cable 341. In principle, however, it is also possible to send and receive the signals not by way of fiber optic cables, but in the form of electric signals by way of an electrical cable or wirelessly.

The optical transmitter can be actuated with an output stage for serial high-speed data transfer of the digital detector module output signals. This output stage can be integrated by circuit engineering techniques, preferably together with further electrical units (such as in particular the analog-to-digital converter and the parallel-to-serial converter), into the detector chip 36, which especially in this case is a CMOS chip.

Using the detector chip or rather the CMOS chip 36, a LED or laser diode can then also be directly actuated in order to transmit the detector module output signals wirelessly or to feed them into the fiber optic cable 341 actuate an optical fiber interface unit, respectively.

A corresponding laser transmitter or LED transmitter and, if applicable, a photodiode receiver can also be mounted and contacted, as in flip-chip technology for example, directly on the rear side of the detector chip 36 facing the detector elements. Furthermore, these units can then also be implemented in the design of the detector chip.

For optical connection of the transmitter and receiver devices, that is, the module inputs and module outputs, with the fiber optic cable 341, it is possible to use customary fiber optic couplers with a beam splitter, with which in known manner, by partial reflection, beams are injected into or extracted from the fiber optic cable 341.

If no fiber optic cable 341 is to be led through the cable duct 34, this itself can alternatively be in the form of an optical fiber. The optical coupling between adjacent detector modules Dx is then effected with optical module connectors, for example, in the form of plug-in elements, which can have lens elements for optical connection of the cable ducts 34 (optical fibers).

To relay the signals from the detector arrangement 10 to the central processing unit Z (and in the reverse direction), at the gantry 1 there can be provided an optical fiber infrastructure, which picks up the optical detector module output signals at the fixing points of the detector modules Dx or rather the detector arrangement 10 on the gantry 1 and relays them to the central processing unit Z, or in reverse direction, transmits the detector module input signals from the central processing unit Z to the detector modules Dx or the detector arrangement 10, respectively.

Specifically for this purpose, module connectors with optical plugs are manufactured so that when the detector modules Dx are mounted on the gantry 1, an optical connection is produced between the detector modules Dx and corresponding input and output points of the optical fiber infrastructure on the gantry 1.

Depending on the design of the module carrier 30 secured to the gantry 1, the module connectors can also be provided with small lenses, so that the tolerances for optical adjustment become greater. Such lenses or other optical fiber interface elements can be mechanically fixed to the module carrier 30.

In particular, in this manner it is possible to produce a module connector having a lens and an optical fiber interface element, which module connector is integrated in the module carrier 30.

In this manner, the module connectors on the detector modules Dx can also be used for serial interconnection of the detector modules Dx, or for injection and extraction of data signals into or from respectively one optical fiber of a multi-optical fiber, in order to interconnect at least some of the detector modules (also) in parallel.

Preferably, the detector modules Dx are combined to groups of, for instance, 4 to 8 modules and interconnected to form a chain (daisy chain), by means of which the detector module output signals are fed in synchronized sequence by way of the optical fiber infrastructure to the central processing unit Z.

Figure 3:
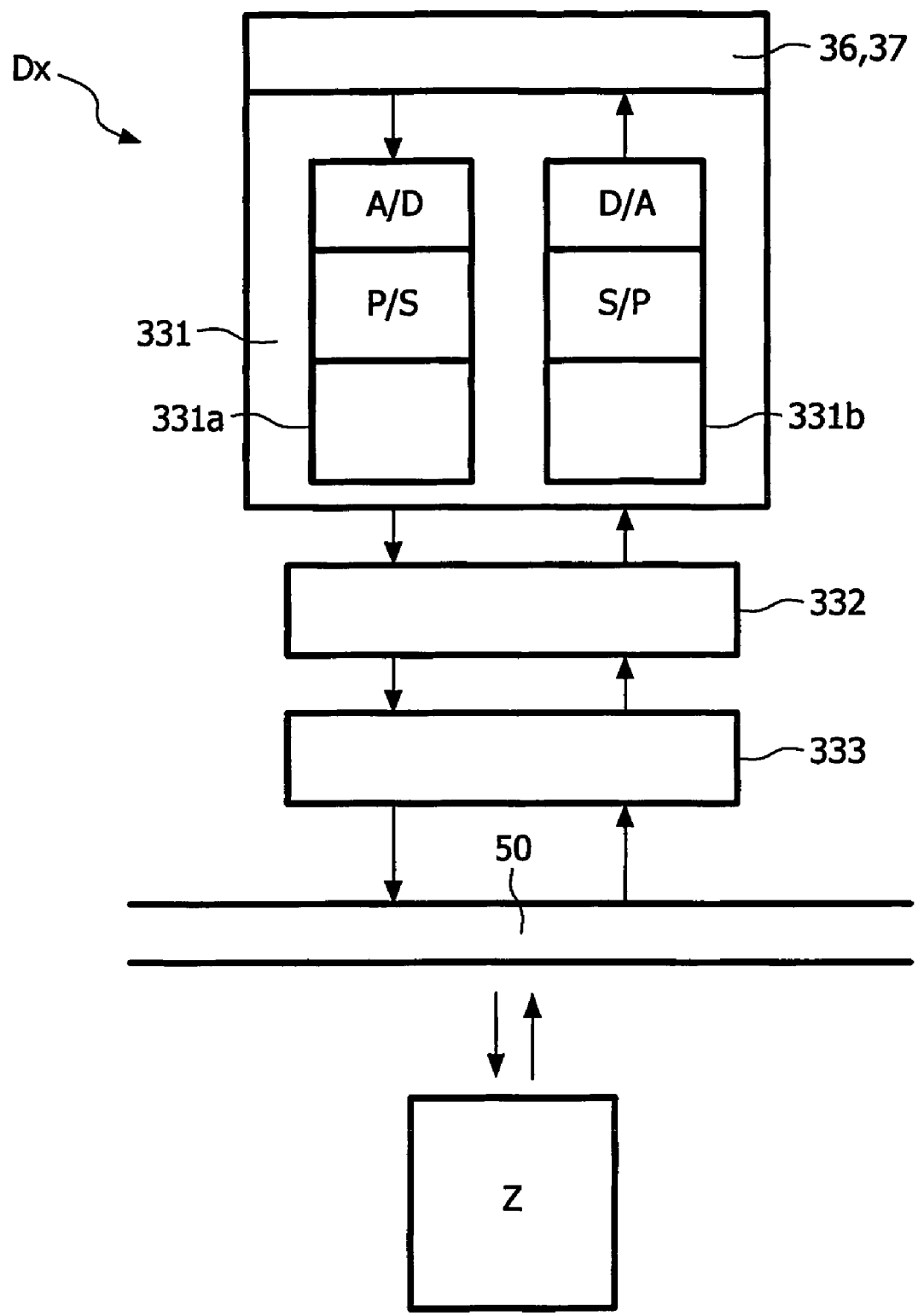
FIG. 3 is a block diagram of a detector module and different electrical components for connection of the module to a processing unit.

FIG. 3 shows schematically a preferred circuit layout of one of the above-described detector modules Dx as well as the essential electrical components that are necessary for transmission of the detector signals to the central processing unit Z in the manner described above.

The detector chip (for example, a CMOS chip 36 with scintillator 37) having a plurality of individual detector elements is located on one surface of the detector module Dx.

Each detector module Dx moreover contains the electrical unit 331 that is provided for preparing or processing the detected detector signals, so that these can be transmitted to the central processing unit Z.

For this purpose, in addition to the customary amplifier circuits for the detector signals, the electrical unit 331 (module electronics) comprises, as explained above, especially the analog-to-digital converter A/D, the parallel-to-serial converter P/S and the electro-optical transducer 331a (for example a laser diode) to produce a serial, digital, optical stream of the detector signals.

Furthermore, the opto-electrical transducer 331b (for example, a photodiode), the serial-to-parallel converter S/P and the digital-to-analog converter D/A are illustrated, with which the control signals fed to the detector module Dx are processed and relayed to the detector chip 36, 37, or rather the detector elements.

The optical fiber coupler 332, of which one end is to be coupled to an output of the electro-optical transducer 331a and to an input of the opto-electrical transducer 331b, is provided for optical connection of the detector module Dx with the central processing unit Z.

The other end of the optical fiber coupler 332 is connected to the optical module connector 333, by way of which respective adjacent detector modules Dx of a module row can be optically connected to one another.

Each module row, formed in each case by a plurality of detector modules Dx, of the detector arrangement 10 is finally connected to an optical backplane 50, with which the detector signals of all detector modules Dx are collected and transmitted to the central processing unit Z.

Figure 4:
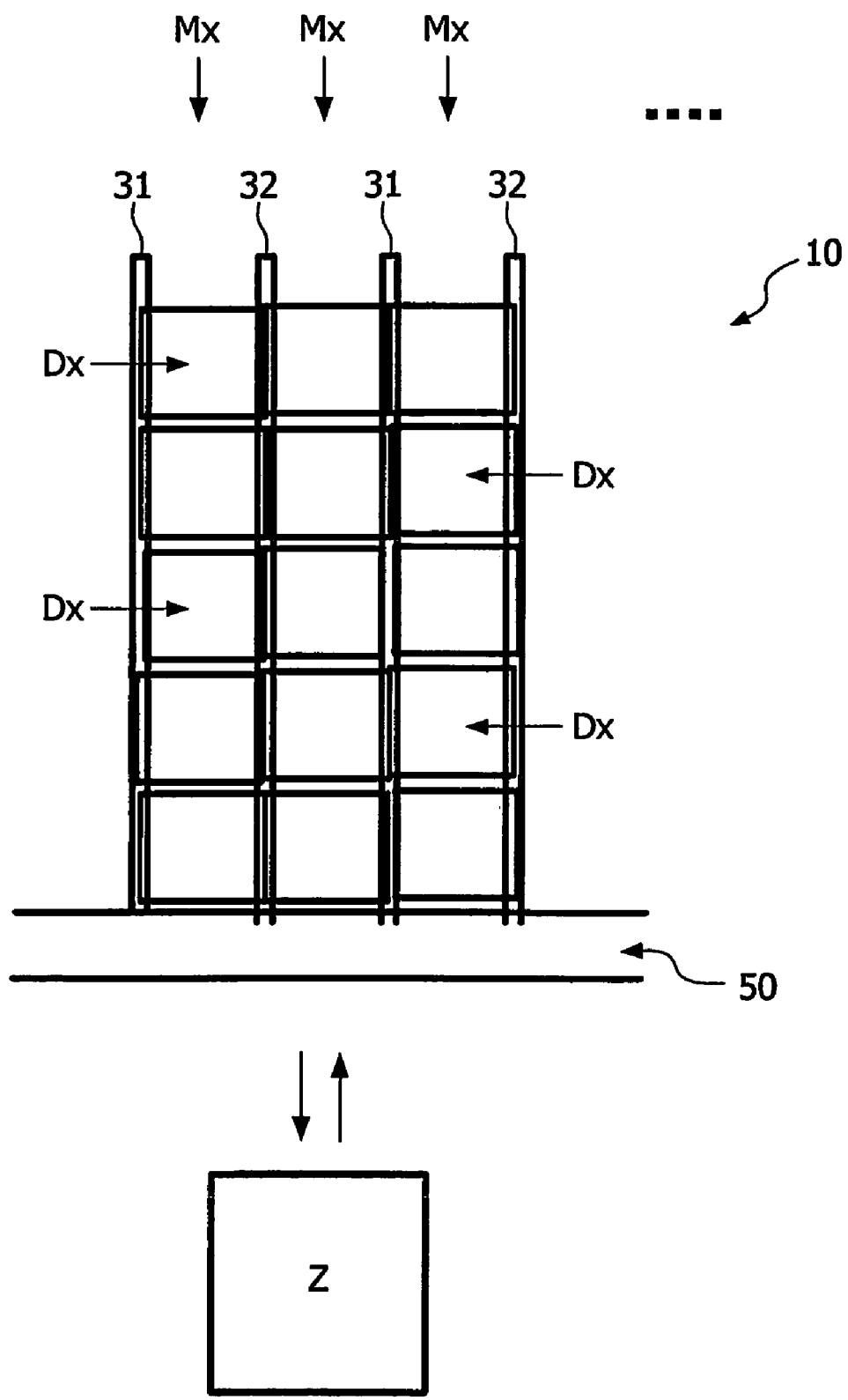
FIG. 4 shows part of a detector arrangement having a plurality of detector modules as shown in FIG. 2.

FIG. 4 shows schematically in plan view such a portion of a detector arrangement 10 with a plurality of detector modules Dx that are arranged in module rows Mx arranged parallel to one another. The detector modules Dx are preferably guided between two respective guide rails 31, 32, as shown in FIG. 2.

As was explained above, the detector modules Dx are each optically coupled with one another by means of a module connector 333, so that the detector signals detected and processed by each detector module Dx are transmitted within each module row Mx from one detector module Dx to the next detector module Dx and arrive at the backplane 50. Transmission of detector module input signals, especially control signals, in reverse direction from central processing unit Z via backplane 50 to the detector modules Dx is also possible.

The plugs and connecting elements required for the electrical power supply can be realized by conventional engineering methods at the detector modules Dx, unless the guide rails 31, 32 are to serve for supply of the electrical voltage.

FIG. 4 also shows the backplane 50 arranged at the edge of the detector arrangement 10; in known manner the backplane is in the form of a printed circuit board with embedded optical fiber cables and lenses for optical coupling with a respective adjacent detector module Dx of each module row Mx. The backplane 50 can also be used as a mechanical support for the detector arrangement, if the guide rails 31, 32 of the module rows Mx are suitably fixed to the backplane 50.

Such a backplane 50 represents a specific embodiment of at least part of the optical fiber infrastructure on the gantry 1, with which the optical signals can be transmitted between the detector arrangement 10 and the central processing unit Z.

The backplane 50 can in this connection additionally be provided with conventional electrical components, for example, for power supply to the detector modules Dx, and with corresponding plug contacts for a respective adjacent detector module Dx of each module row Mx.

Upon possible connection of several such backplanes 50 or corresponding printed circuit boards, optical junctions are likewise provided between these, so that the (bi-directional) transfer of data can be effected completely by optical means.

In addition to a wireless transmitter for transmitting the detector module output signals to the evaluating unit, the central processing unit Z in turn comprises preferably also a wireless receiver, by means of which the detector module input signals (for example, signals for controlling the detector arrangement) are received and, as described above, relayed to the detector modules Dx.

In these cases, for the electrical components, that is, the detector arrangement 10 with central processing unit Z, located on the rotating unit of the gantry 1, just one connection, that is to say, just one plug-in connector for the power supply to the central processing unit Z and the detector arrangement 10 is required, which can be effected in the customary and relatively simple manner by means of slip-ring contacts.

A further advantage of the described embodiments consists in that the large amounts of data accumulating with ever-larger detectors can be optically transmitted over the entire route from detector element to the central processing unit Z, so that no complex conversion is necessary. The effort involved in mounting and cabling of the detector arrangement 10 is likewise substantially less than with conventional systems, and no crosstalk problems arise.

The invention claimed is:

1. A detector arrangement comprising:
    at least one detector module having a plurality of individual detector elements, which detect radiation and generate signals indicative of the radiation, the at least one detector module comprising:
    an electrical unit, comprising:
        an electro-optical transducer for processing the generated signals and for generating optical detector module output signals indicative of the generated signals; and
        an opto-electrical transducer for processing detector module input signals and supplying the input signals to the detector elements; and the at least one detector module further comprising a module carrier having an inner space for the electrical unit and having a cable duct for at least one optical fiber cable.

2. A detector arrangement as claimed in claim 1, in which the electrical unit comprises an analog-to-digital converter and a parallel-to-serial converter for generating a serial digital detector module output signal.

3. A detector arrangement as claimed in claim 1, in which the electrical unit comprises a digital-to-analog converter and a serial-to-parallel converter for generating a parallel analog detector module input signal.

4. A detector arrangement as claimed in claim 1, in which the opto-electrical transducer comprises an LED diode.

5. A detector arrangement as claimed in claim 1, having at least one optical fiber coupler with which the at least one detector module is optically coupled to an optical fiber cable.

6. A detector arrangement as claimed in claim 1, in which the at least one detector module comprises a detector chip on which the detector elements are formed.

7. A detector arrangement as claimed in claim 6, in which the electrical unit is integrated in the at least one detector chip.

8. A detector arrangement as claimed in claim 6, in which the at least one detector module comprises a CMOS chip on which the detector elements are formed.

9. A detector arrangement as claimed in claim 1, in which the at least one detector module is slidably guided between two guide rails, of which at least one rail is provided for connection of a terminal of a power supply to the detector module.

10. A detector arrangement as claimed in claim 1, in which the detector module comprises a module connector for optical connection of the detector module to a further detector module arranged adjacent thereto or to an optical fiber interface that is provided for connection of the detector arrangement to a processing unit or central processing unit.

11. A detector arrangement as claimed in claim 10, in which the optical fiber interface comprises a backplane in the form of a printed circuit board having a plurality of embedded optical fiber cables for optical connection of the detector arrangement to the processing unit or central processing unit.

12. A computed tomograph apparatus having a gantry with a detector arrangement as claimed in claim 1.

13. A computed tomograph apparatus as claimed in claim 12, in which the detector arrangement and a processing unit in the form of a central processing unit output signals to a stationary evaluating unit arranged on a rotatable part of the gantry, wherein the evaluating unit is stationary relative to the gantry, the detector arrangement being optically connected to the central processing unit through an optical fiber infrastructure.

14. A computed tomograph apparatus as claimed in claim 13, wherein the detector arrangement and processing unit further form a buffer memory for wireless transmission, wherein the buffer memory outputs signals to the stationary evaluating unit arranged on the rotatable part of the gantry, the detector arrangement being optically connected to the buffer memory through an optical fiber interface.

15. A detector arrangement as claimed in claim 1, wherein the electro-optical transducer is coupled to an optical fiber coupler for optical connection of the detector arrangement to a central processing unit, wherein the optical signals are indicative of the signals produced by the detector elements.

16. A detector arrangement as claimed in claim 1, wherein the electro-optical transducer comprises a laser diode.

17. A method comprising:
    detecting radiation and generating electrical signals indicative thereof with one or more detector elements of a radiation sensitive detector module, where the radiation sensitive detector module comprises a module carrier having a cable duct for at least one optical fiber cable;
    generating optical output signals indicative of the electrical signals using an electro-optical transducer of the radiation sensitive detector module; and
    supplying input signals to an opto-electrical transducer of the radiation sensitive detector module for the detector elements of the radiation sensitive detector module.

18. The computed tomography method of claim 17, further comprising:
    transmitting detector module output signals through at least one optical fiber coupler to an optical fiber cable; and
    receiving detector module input signals from the optical fiber cable through the at least one optical fiber coupler.

19. A detector module for an imaging system, comprising:
    one or more detector elements;
    an electro-optical transducer that generates optical output signals indicative of radiation detected by the one or more detector elements;
    an opto-electrical transducer that receives input signals and supplies said signals to at least one of the detector elements; and
    a module carrier having an inner space for the electro-optical transducer and the opto-electrical transducer and having a cable duct for at least one optical fiber cable.

* * * * *